United States Patent [15] 3,689,127
Hampp et al. [45] Sept. 5, 1972

[54] ROLLER BEARING
[72] Inventors: Wilhelm Hampp; Stig Sandstrom, both of Schweinfurt, Germany
[73] Assignee: SKF Kugellagerfabriken GmbH, Schweinfurt, Germany
[22] Filed: April 30, 1970
[21] Appl. No.: 33,404

[30] Foreign Application Priority Data
May 2, 1969    Germany .........G 69 17 771.5

[52] U.S. Cl. ................................................308/214
[51] Int. Cl. .............................................F16c 33/00
[58] Field of Search................................308/214, 213

[56] References Cited
UNITED STATES PATENTS 1,498,571   6/1924   Polmgren ..................308/214
1,772,346   8/1930   Gibbons ....................308/213
1,194,918   8/1916   Wright.......................308/214
2,098,683   11/1937  Wise..........................308/214
3,397,020   8/1968   Edwards....................308/214

FOREIGN PATENTS OR APPLICATIONS 990,551   4/1965   Great Britain.............308/214

Primary Examiner—Martin P. Schwadron
Assistant Examiner—Frank Susko
Attorney—Richard Low and Murray Schaffer

[57] ABSTRACT

A roller bearing having inner and outer rings each having races of a curved shape axially of the bearing. A plurality of rollers are arranged between the rings, the rollers having a surface conforming to curvature of the races and axes sloping toward the axis of the bearing. At least one of the rings having a separate retaining rim.

7 Claims, 6 Drawing Figures

PATENTED SEP 5 1972 3,689,127

INVENTOR.
WILHELM HAMPP
STIG SANDSTROM
BY Murray Schafer
ATTORNEY

ROLLER BEARING

The present invention relates to roller bearings and in particular to a roller bearing suitable to take both radial and axial loads.

Tapered roller bearing comprising a series of conical rollers arranged with their axes inclined toward the central axis of rotation of the bearing are well known. The rollers are secured between an outer ring and an inner ring each of which is provided with a retaining shoulder or rim which secures the roller against axial shifting. Such bearings, while suitable for both radial and axial loading cannot be assembled without much difficulty and it has become expedient to provide at least one of the rings with a separable retaining rim. Similar bearings have also been made with cylindrical rollers instead of tapered rollers.

These well known embodiments, employing the tapered and/or cylindrical rollers, have the defect that they are extremely sensitive to variations and deflections in the position of the inner ring relative to the outer ring, as would, for example, occur through the sagging or inclination of the axle borne by the bearing. Under such conditions the rollers and the races in which they ride are subjected to harmful edge stress which could lead to a premature breakdown of the bearing.

The present invention is directed to the construction of a bearing in which these defects are overcome. It is an object of the present invention to provide a roller bearing suitable to take up axial or radial loads, even simultaneously in both directions and which is not sensitive to variations in the position or inclination of the axle.

According to the present invention there is provided a roller bearing having in combination the following characteristics:

a. inner and outer rings, each having races the surfaces of which are generated by a concise curve axially between the ends of rings;

b. rollers having convexly curved outer faces conforming to the curve of the races and having their axes sloping toward the axis of rotation of the bearing; and c. at least one of the rings being provided with a separate independent retaining ring.

The curved form of the roller surfaces and races creates a self adjusting bearing that conforms to and follows the deflection of the axle, easily and without distortion between the engaging roller surfaces. Through the arrangement of a loose or separate rim on at least one of the rings the bearing can be assembled with very little difficulty.

Another advantage of the present invention arises from the ability to join the separable rim to the ring. By securing the rim to the ring after the bearing is assembled a unitary device is obtained in which the rollers are perfectly matched, without stress or strain on the assembly, and which can be easily transported, packaged etc and later installed for use where desired.

In order to increase the axial load bearing ability the present invention permits the side faces of the roller bearing to be made in a spherical, cambered or crowned shape. The corresponding surfaces of the retaining rims being similar and correspondingly formed.

Full details of the present invention, as well as illustration of its advantages appear in the following description and from the accompanying drawing in which.

Figure 1:
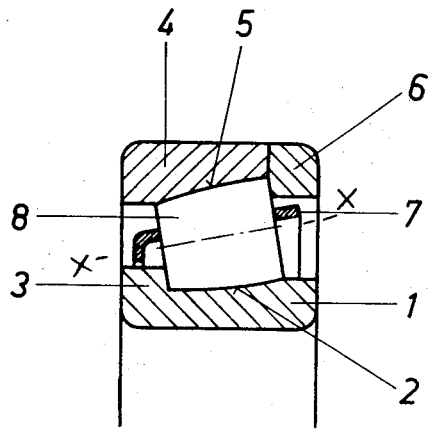
FIG. 1 shows a bearing having and unsymmetrical rollers and a separable rim in the outer ring according to the present invention.

The bearing seen in FIG. 1 comprises an inner ring 1 and an outer ring 4 each having conforming curved, generally concave race surfaces 2 and 5 respectively which have at opposed axial ends diameters of small and large size. The inner ring 1 is milled or otherwise formed, at its smaller diameter end with an integral shoulder forming a bearing retaining rim 3, while the outer ring is formed and has its opposite but corresponding end cut away and provided with a separate independent retaining rim 6. Located between the inner and outer rings 1 and 4 respectively is a roller cage 7 of conventional design in which a plurality of rollers 8 are freely rotatable.

The rollers, as seen in FIG. 1 are unsymmetric having a convexedly curved axial outer face of the same crowned shape as the races 2 and 5 and conforming thereto, so that they lie between the races with their individual axes X—X inclined or sloping toward the central roller axis of the bearing itself.

Figure 5:
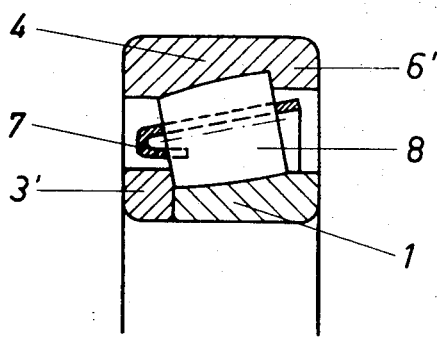
FIG. 5 is a bearing similar to that of FIG. 1 where the separable rim is associated with the inner ring.

The separate retaining rim 6 is preferably fastened to the outer ring 4 by any suitable method. Gluing, soldering, welding or the use of a retaining ring as seen in FIG. 5 may be used.

As seen in FIG. 1, the center of the curved surface of the race 5 in the outer ring (i.e. the high point) lies on the transverse axis to the central roller axis that is on the radial bearing axis. The radius of the curve of the race is suitably selected so that the bearing may be readily adjusted.

From the preceding description it will be seen that the construction of the bearing is simple and uncomplicated and that it is readily adaptable to take up radial loads as well as axially directed loads from either side of the bearing. Because the curved surface of the roller 8 and the conforming races 2 and 5 any deflection or inclination of an axle or shaft, held by the bearing, is instantly compensated for. The engaging roller surfaces maintain their engagement over their entire surfaces even though the inner and outer rings are axially shifted or deflected.

Various modifications can be made of the structure shown in FIG. 1, some of which provide enhanced benefits, other modifications may have special application or use. A few alternative embodiments are shown in FIGS. 2 through 6 wherein similar structural components are referenced with the same numbers and function in the manner described in connection with the bearing shown in FIG. 1.

Figure 2:
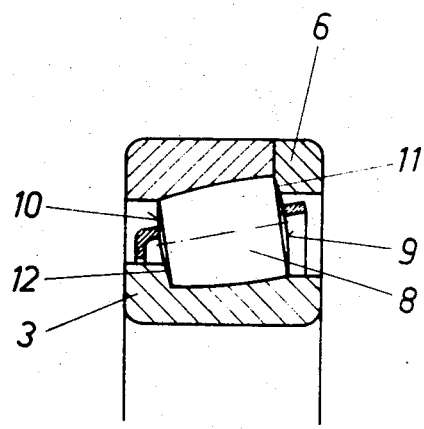
FIG. 2 is a roller bearing similar to that of FIG. 1, having spherical or ball like side surfaces.

The bearing shown in FIG. 2 is in general the one shown in FIG. 1 except that the roller 8 is also provided with side faces 9 and 10 which are spherically bowed or crowned. The corresponding race faces of the retaining rims 3 and 6 respectively, are provided with corresponding dished or concave shapes. This embodiment not only provides the advantages of the structure of FIG. 1 but because of the curved side faces and races, enhances axial load bearing characteristics are obtained.

Figure 3:
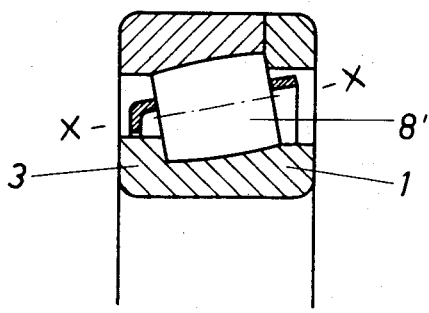
FIG. 3 is a bearing of similar form having symmetrical rollers.

The bearing of FIG. 3 illustrates the adaptation of the present invention with a symmetrical roller 8'. In this case the race surfaces of the rings 1 and 2 are also symmetrical, but are generally inclined so that their axes X—X are inclined to the bearings' central axis.

Figure 4:
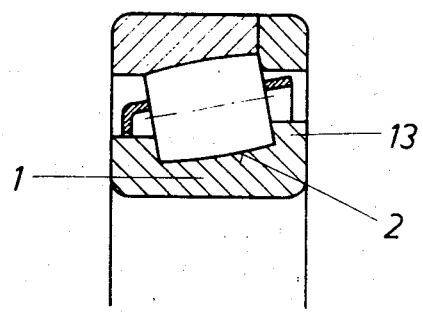
FIG. 4 is a bearing similar to that of FIG. 3 in which the inner ring is provided with a pair of fixed rims.

In FIG. 4 a symmetrical roller is also illustrated, however, here the inner ring is made with a second fixed or integral retaining rim 13 opposite to the previously described rim 3.

FIG. 5 illustrates a bearing in which the unsymmetrical roller of FIG. 1 is employed in ring structure where a separate rim 3' is located on the inner ring 1 rather than the outer ring 4 and at the smaller diameter end. In this embodiment the natural slope of the roller causes the engagement of its downward edge against the separate rim 3', however, the bearing functions equally as well. The outer ring 4 is provided with an integral rim 6' in place of the separable rim 6 as was shown in FIG. 1.

FIG. 5 also illustrates another modification, namely one dealing with the form of the cage 7. As seen in FIG. 5 the cage 7 is formed so as to be self supporting of the roller having a turned in portion adapted to hold the roller 8 against axial or radial movement even if the rim 3' is removed, preventing the roller from falling out of the cage and outer ring.

Figure 6:
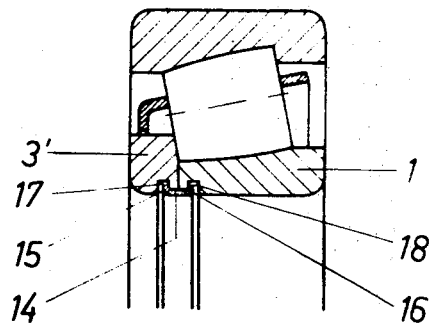
FIG. 6 is a bearing similar to that of FIG. 1 showing the securement of the separable ring by a U-shaped retaining member.

In FIG. 6 a similar bearing is illustrated. However, here the separate rim 3' is provided with a U-shaped annular clip ring 14 having radially inturned flanges 15 and 16 which fit into a corresponding groove 17 formed in the rim 3' and a groove 18 formed in the inner ring 1 respectively. The clip ring 14 seats flush with the surface of the inner so as not to interfere with the bearing action.

The aforementioned embodiments are for illustrative purposes only. It will be apparent that the features shown may be combined in various combinations and permutations without departing from the spirit of the present invention. For example, the clip 14 may be adapted to hold the rim 6 in the outer ring as seen in FIGS. 1 or 2. Also each of the rings 1 and 4 may be provided with separate and independent rims. The rims may also be employed to center the rollers and the inner and outer ring by employing a closure of sealing member which joins the rings.

What is claimed is:

1. A roller bearing comprising an inner and outer ring each having an axially curved race surface, a plurality of rollers arranged between said rings in a single row each with their respective axes inclined in the same direction toward the central axis of said bearing, said rollers having curved outer surfaces conforming to the curve of said races, a shoulder integrally formed at the axial end of one of said rings to maintain said rollers against axial movement in one direction and at least the other one of said rings having a separate retaining rim at the axially opposite end for maintaining the rollers against axial movement in the other direction.

2. The bearing according to claim 1 wherein said races are concave and said roller surface is convex, and the high point of said curve lies along the radial transverse axis of the bearing.

3. The bearing according to claim 1 wherein curve of said race and said rollers is unsymmetrical and has a greater diameter at one end than at the other.

4. A roller bearing comprising an inner and an outer ring each having an asymmetrical axially curved race surface having a greater diameter at one end than at the other, a plurality of rollers arranged between said rings with their respective axes inclined toward the central axis of said bearing, said rollers having curved outer surfaces conforming to the curve of said races, at least one of said rings having a separate retaining rim, said separate retaining rim being located on the outer ring adjacent the larger diameter end.

5. The bearing according to claim 3 wherein the separate retaining rim is located on the inner ring adjacent the smaller diameter end of the raceway.

6. The bearing according to claim 1, wherein said separate rim is secured to said retaining ring by an annular clip having lateral flanges adapted to seat within mating grooves formed in the rim and associated ring, respectively.

7. The bearing according to claim 1 wherein the sides of said rollers are formed with a bow shape and the surfaces of said ring rims are formed with a corresponding curved race surface.

* * * * *